April 5, 1927. 1,623,687
G. Y. LAUCHIN
MOTOR VEHICLE LAMP
Filed May 17, 1924. 2 Sheets-Sheet 1
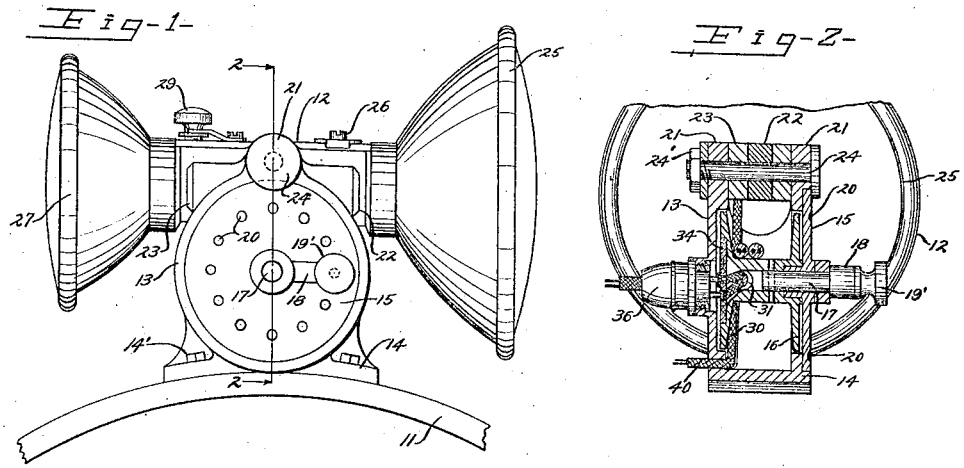
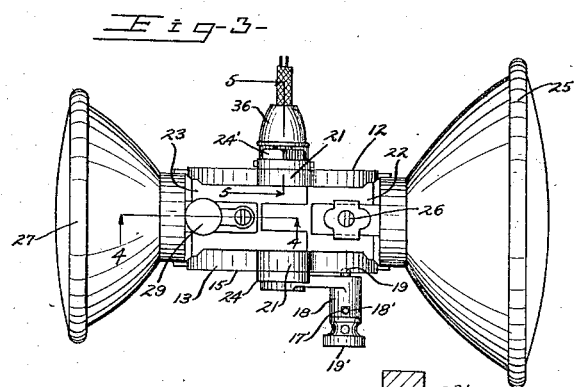
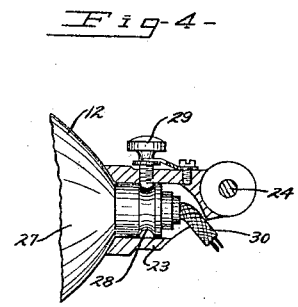
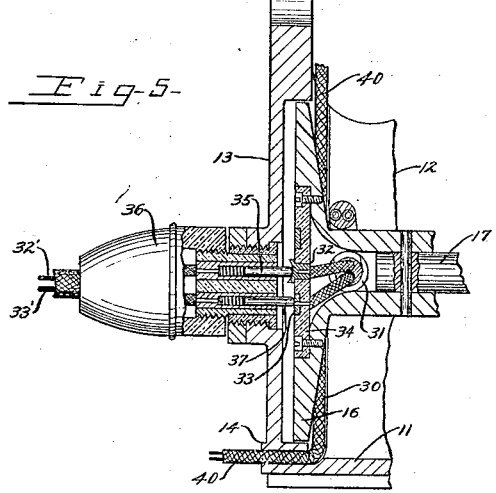
INVENTOR.
George Y. Lauchin.
BY
Morsell Keeney & Morsell
ATTORNEYS.

April 5, 1927.
G. Y. LAUCHIN
1,623,687
MOTOR VEHICLE LAMP
Filed May 17, 1924
2 Sheets-Sheet 2
Fig-6-
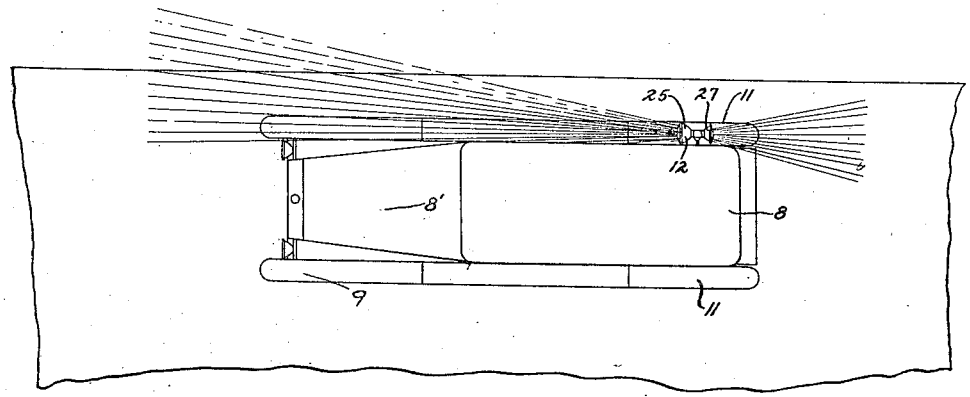
Fig-7-
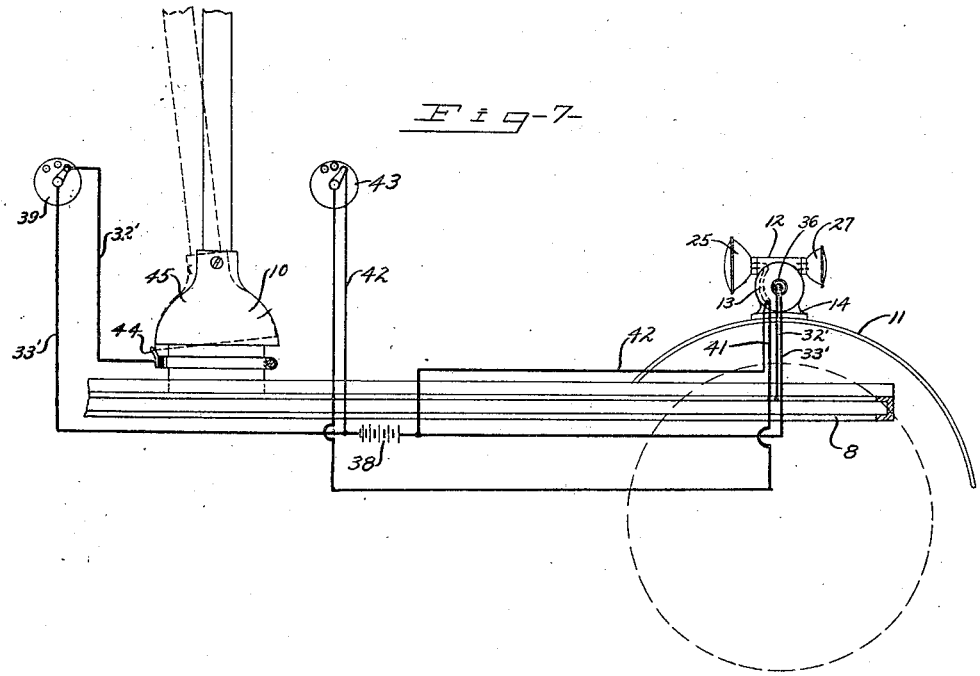
INVENTOR.
George Y. Lauchin
BY
Morrill, Reeney & Morrill
ATTORNEYS.

Patented Apr. 5, 1927.

1,623,687

UNITED STATES PATENT OFFICE.

GEORGE Y. LAUCHIN, OF GREEN BAY, WISCONSIN.

MOTOR-VEHICLE LAMP.

Application filed May 17, 1924. Serial No. 714,064.

This invention relates to improvements in motor vehicle lamps.

Motor vehicle lamps are usually placed at the front portion of the vehicle and when so positioned the rays of light from the lamps are very objectionable to drivers of other vehicles travelling towards the lamps and many accidents have been caused thereby. Furthermore the lamps so positioned do not clearly show the side of the road close to the vehicle and are otherwise objectionable.

It is one of the objects of the present invention to overcome the before mentioned objectionable features and provide a motor vehicle lamp so mounted on the vehicle as to clearly illuminate the road in front and along the right hand side of the vehicle.

A further object of the invention is to provide a motor vehicle lamp so mounted on the vehicle as to prevent the rays of light from the lamp in any manner interfering with the approaching driver.

A further object of the invention is to provide a motor vehicle lamp which may also be used to direct rays of light rearwardly of the vehicle, and also in which the rays of light may be adjusted upwardly or downwardly.

A further object of the invention is to provide a motor vehicle lamp which may be disengaged from its support and used as a trouble lamp, as the electrical connection between the lamp and the support is extensible.

A further object of the invention is to provide a motor vehicle lamp in which the flexible electric circuit cables are wound upon a drum within the support to permit the use of the lamp when detached from the support.

A further object of the invention is to provide a motor vehicle lamp which is of simple construction, is strong and durable and is well adapted for the purpose described.

With the above and other objects in view the invention consists of the improved motor vehicle lamp and its parts and combinations as set forth in the claims, and all equivalents thereof.

In the accompanying drawing in which the same reference characters indicate the same parts in all of the views:

Fig. 1 is a side view of the improved motor vehicle lamp shown mounted upon a portion of a vehicle fender;

Fig. 2 is a vertical sectional view thereof taken on line 2—2 of Fig. 1;

Fig. 3 is a top view of the lamp.

Fig. 4 is a sectional detail view taken on line 4—4 of Fig. 3;

Fig. 5 is a sectional detail view taken on line 5—5 of Fig. 3;

Fig. 6 is a top view of a motor vehicle showing the improved manner of mounting the lamp thereon; and Fig. 7 is a diagrammatic view of the electrical connections of the lamp.

Referring to the drawings the numeral 8 indicates a motor vehicle, 9 the front fenders thereof, 10 the transmission shift lever, 11 the rear fenders of the vehicle and 12 the improved lamp mounted thereon. The lamp is mounted on the upper portion of the rear right hand fender so that the body 8' serves as a screen to prevent the direct rays of light from interfering with the vision of a vehicle driver approaching from the opposite direction. As thus positioned the rays of light from the lamp will be directed ahead of and along the side of the vehicle and the road and clearly show the street curb or the road ditch. As another vehicle will approach at an angle, the body of the first mentioned vehicle will be interposed between the lamp and the approaching vehicle and the rays of light will be prevented from shining into the eyes of the driver of said approaching vehicle although the first mentioned vehicle will be clearly visible. The lamp comprises a casing 13 having a base portion 14 adapted to be secured to the right hand rear fender 11 by bolts 14'. Said casing is of circular form having an open front closed by a cover 15 and a drum 16 positioned within the casing is provided with a shaft 17 which is journaled in and extends through the cover 15 and at its outer end is provided with a crank 18 for turning the drum. The crank is provided with a spring pin 19 which is adapted to enter any one of the circumferential line of recesses 20 formed in the cover to hold the arm in adjusted position. The spring pin 19 is provided with a handle 19' to disengage the pin from the recesses 20 and to hold said pin out of engagement with the recesses a cross pin 18' is provided which plays in a slot 17' and which cross pin when out of register with said slot 17' and resting on the crank 18 will hold the spring pin 19 in a disengaging position. The upper portion of the casing is provided with eyed ears 21 between which are positioned tiltable tubular socket members 22 and 23 which are pivotally connected and clamped to the eyed ears by a bolt 24 and a nut 24'. The socket member 22 receives and holds the front lamp unit 25 which is secured in position by a screw 26 while the socket member 23 receives and removably holds a rear lamp unit 27. Said removable lamp unit 27 is formed with a groove 28 in its stem which is entered by a thumb screw 29 to hold the lamp in position. An insulated electric circuit wire cord 30 connected to the lamp unit 27 extends loosely through the socket member 23 and is wound around the drum 16 and its inner end enters the opening 31 in the drum 16 and the ends of the wire enclosed in the insulating cord are connected to terminal members 32 and 33 which are mounted in and extend through an insulating plate 34 carried by the inner face of the drum. The terminal member 32 is in the axial center line of the drum and is engaged by a spring pin 35 forming part of an electric connector plug 36, while the other terminal member 33 is in the form of a ring which is engaged by the other spring pin 37 of the connector. Wires 32' and 33' forming part of the connector 36 are included in a circuit which includes a battery 38 and a controlling switch 39 preferably mounted on the dash of the vehicle.

The insulating cord 40 of the front lamp unit 25 extends through its coupling 22 and through the casing and its wires 41 and 42 extend to the battery 38 and a switch 43 and is controlled thereby. The ground connection wire 32' of the rear lamp unit 27 is interrupted by an insulated contact 44 which is engaged by a transmission lever part 45 to complete the ground when said lever is in position to back the car as shown in Fig. 7 and the switch 43 is in off position. When it is desired to use the rear lamp unit removed from the socket it is of course necessary to place the transmission lever in the backing position as shown.

In use the front lamp unit will direct its rays forward and along the ditch or curb side of the road without in any manner interfering with the vision of the drivers of approaching vehicles, and in backing the rear lamp unit will be automatically turned on and the rays thereof will illuminate the road to the rear of the vehicle.

If trouble should develop in any portion of the vehicle the rear lamp unit can be easily removed from its socket and the circuit cord unwound from the drum to permit the lamp unit to be used around any portion of the vehicle.

From the foregoing description it will be seen that the motor vehicle lamp is of very simple construction and is well adapted for the purpose described.

What I claim as my invention is:

1. The combination with a motor vehicle having a shift lever and a rear right hand fender, of a lamp therefor mounted on the rear right hand fender for directing rays of light from the lamp forwardly and rearwardly and on the right hand side of the vehicle, said lamp having two lamp units one of which is removable for other use around the vehicle, a switch automatically moved by the shift lever for controlling the removable lamp, and a drum means for holding an electric circuit wire cord to form a circuit connection with the removable lamp unit in either position of use.

2. A motor vehicle lamp, comprising a casing, oppositely extending lamp sockets connected to the casing, lamps carried by said sockets and one of said lamps being removable for use around the vehicle, a drum journaled in the casing and having a center and a ring, electrical yielding pin contact, the ring contact being concentric to the center contact, contacts carried by the casing which are engaged by the drum contacts, manually operable means for rotating the drum, and an electric circuit wire cord connected to the drum contacts and wound on the drum and connected to the removable lamp to transmit current thereto.

3. A motor vehicle lamp, comprising a casing, oppositely extending lamp sockets tiltably connected to the casing, lamps carried by the sockets and one of said lamps being removable for use around the vehicle, a drum journaled in the casing and having an axial contact and a ring contact, contacts carried by the casing which are engaged by the drum contacts, means for rotating the drum, means for locking the drum in adjusted position, an electric circuit cord connected to the axial contact and the ring contact and wound on the drum and connected to the removable lamp to transmit current thereto.

4. A motor vehicle lamp, comprising a casing, oppositely extending lamp sockets tiltably connected to the casing, lamps carried by the sockets and one of said lamps being removable for use around the vehicle, a drum journaled in the casing and having an axial contact and a ring contact, contacts carried by the casing which are engaged by the drum contacts, means for rotating the drum, means for locking the drum in adjusted position, electric circuit cord connected to the axial contact and the ring contact and wound on the drum and connected to the removable lamp to transmit current thereto, and circuit wires for connection with the casing contacts and a shiftable portion of a vehicle.

5. A motor vehicle lamp, comprising a casing, oppositely extending lamp sockets tiltably connected to the casing, lamps carried by the sockets and one of said lamps being removable for use around the vehicle, a drum journaled in the casing and having an axial contact and a ring contact, yielding pin contacts carried by the casing which are engaged by the drum contacts, manual means for rotating the drum, means for locking the drum in adjusted position, electric circuit cord connected to the axial contact and the ring contact and wound on the drum and connected to the removable lamp to transmit current thereto, circuit wires for connection with the casing contacts and a shiftable portion of a vehicle, a switch controlling the circuit to one of the lamps, a switch controlling the circuit to the removable lamp, and means for securing the removable lamp in the socket member.

In testimony whereof, I affix my signature.

GEORGE Y. LAUCHIN.